US006981994B2

(12) United States Patent
Drnevich et al.

(10) Patent No.: US 6,981,994 B2
(45) Date of Patent: Jan. 3, 2006

(54) PRODUCTION ENHANCEMENT FOR A REACTOR

(75) Inventors: Raymond Francis Drnevich, Clarence Center, NY (US); Gary Wayne Fenner, Grand Island, NY (US); Hisashi Kobayashi, Putnam Valley, NY (US); Lawrence E. Bool, III, East Aurora, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/224,422

(22) Filed: Aug. 21, 2002

(65) Prior Publication Data

US 2003/0110693 A1 Jun. 19, 2003

Related U.S. Application Data

(63) Continuation-in-part of application No. 10/024,056, filed on Dec. 17, 2001.

(51) Int. Cl.
*C01B 3/32* (2006.01)

(52) U.S. Cl. .................. 48/198.7; 48/198.1; 48/198.2; 48/198.5; 48/198.8

(58) Field of Classification Search ................ 422/187, 422/24, 189, 190, 191, 193, 192; 48/197 R, 48/198.1, 198.2, 198.5, 198.7, 198.8
See application file for complete search history.

(56) References Cited

U.S. PATENT DOCUMENTS 4,365,006 A * 12/1982 Baker .......................... 429/17
4,988,283 A * 1/1991 Nagasawa et al. ............ 429/17
5,264,202 A * 11/1993 Snyder ....................... 423/653
5,417,051 A * 5/1995 Ankersmit et al. ........... 60/783
5,752,995 A 5/1998 Kang ......................... 48/198.7
5,852,925 A * 12/1998 Prasad et al. ................. 60/783
6,200,128 B1 3/2001 Kobayashi ..................... 431/5
6,217,681 B1 4/2001 Bazarian et al. ............ 148/688

FOREIGN PATENT DOCUMENTS

EP 0798798 A2 * 10/1997
EP 1077198 A2 2/2001
EP 1077198 A3 2/2001

OTHER PUBLICATIONS

Pan et al., "$CO_2$ Reforming and Steam Reforming of Methane at Elevated Pressures: A Computational Thermodynamic Study" Proc.—Annu. Int. Pittsburgh Coal Conference, vol. 16, 1999, pp. 1649-1695.
Choudary et al., "Simultaneous Steam and $CO_2$ Reforming of Methane to Syngas over NiO/MgO/SA-5205 in the Presence and Absence of Oxygen", Applied Catalysis A: General. 168. (1998), pp. 33-46.

(Continued)

*Primary Examiner*—Basia Ridley
(74) *Attorney, Agent, or Firm*—David M. Rosenblum

(57) ABSTRACT

This invention is directed to a process for increasing production of product that is formed in a reactor having a combustion section in which fuel is burned to produce heat to drive an endothermic reaction occurring within a reaction section. Production is increased by adding supplemental oxygen to air or other oxygen containing gas used to support combustion in the combustion section, thereby to generate more heat to support an increase in the endothermic reaction. Additionally, supplemental oxygen can be introduced into the reaction section to partially oxidize a reactant to generate heat and to allow an increase in the production of the product. Supplemental oxygen may be added directly to the steam-methane mixture, or to the combustion air.

6 Claims, 8 Drawing Sheets

OTHER PUBLICATIONS

Tjatjopoulos et al., "Feasibility Analysis of Ternary Feed Mixture of Methane with Oxygen, Steam, and Carbon Dioxide for the Production of Methanol Synthesis Gas," Industrial and Engineering Chemistry Research, vol. 37, No. 4, Apr. 1998, pp. 1410-1421.

Lambert et al., "Thermodynamic Efficiency of Steam Methane Reforming with Oxygen Enriched Combustion", The 5th World Congress of Chemical Engineering: Technologies Critical to the Changing World. vol. III: Emerging Energy Technologies, Clean Technologies, Remediation, and Emission Control, Fuels and Petrochemicals. Jul. 14-18, 1996, San Diego, CA, Publisher; AlChE, NY, NY pp. 39-44.

* cited by examiner

Figure 3 - Tube Wall Profile
Average Tube Wall Temperature, F
1,700
1,650
1,600
1,550
1,500
1,450
1,400
0
10
20
30
40
50
Distance from Entrance, Ft
Baseline
2.4% Oxygen
1% Oxygen

PRODUCTION ENHANCEMENT FOR A REACTOR

RELATED APPLICATIONS

This is a continuation-in-part of application Ser. No. 10/024,056 filed Dec. 17, 2001, now abandoned.

FIELD OF THE INVENTION

The present invention relates to a process for enhancing the production of a product within a reactor in which the product is produced by an endothermic reaction between a reactant and steam and heat is generated to support the endothermic reaction by either oxidation or partial oxidation of a fuel. More particularly, the present invention relates to such a process in which production is enhanced by introduction of supplemental oxygen into the reactor. Still, more particularly, the present invention relates to such a process in which the reactor is a steam methane reformer, a pyrolysis furnace or a dehydrogenation furnace.

BACKGROUND OF THE INVENTION

The production of products by various endothermic reactions involving steam takes place in a variety of reactors. For instance, synthesis gases ("syngas") containing hydrogen and carbon monoxide are produced in a reactor known as a steam methane reformer. The steam methane reforming reaction is an endothermic process that involves the reaction of a hydrocarbon containing reactant with steam with a reaction section of the reformer. The endothermic process is driven by heat produced by burning a fuel in the combustion section of the reformer.

Commonly, in steam methane reformers ("SMR's"), the syngas is produced from natural gas. Before entering the SMR, steam is added to natural gas prior to being fed into the reaction section of the SMR. The endothermic reforming reaction is:

$$CH_4+H_2O \leftarrow\rightarrow 3H_2+CO.$$

The shift conversion reaction shown below also takes place in the reformer and establishes the equilibrium between the hydrogen and carbon oxide species in the reformed gas:

$$CO+H_2O \leftarrow\rightarrow H_2+CO_2.$$

The fuel used to provide the heat required for the endothermic reaction can also be natural gas. Typically, an air stream and a natural gas stream are fed through burners into the radiant section of the combustion section for combustion of the natural gas supported by oxygen within the air.

There are several approaches that the industry has taken in order to increase the productivity of an SMR. One approach is to increase the firing rate of the primary reformer. The output is increased by burning more fuel, which raises the average temperature on the combustion side of the reforming system. As a result, more heat is transferred to the reaction section and more gas can be processed.

Other approaches employ additional processing equipment. These include the addition of a low temperature shift reactor, a pre-reformer, and a post reformer.

The low temperature shift reactor would follow the high temperature shift unit and convert more of the moisture reacting with carbon monoxide to produce hydrogen. However, it does not increase reformer throughput.

In a pre-reformer, adiabatic steam-hydrocarbon reforming is performed on the process gases prior to introducing the process gases into the reformer. Heat for the reforming reactions is obtained by preheating the feed against hot flue gases in the reformer convection section.

There are two types of post reformers: a bypass-feed product-heat-exchange reformer and an oxygen secondary reformer. The bypass-feed product-heat-exchange reformer uses the heat contained in the reformer product gas to provide the heat to drive additional reforming. The feed to this unit is normally a steam-hydrocarbon mixture that bypasses the primary reformer. The oxygen secondary reformer involves adding oxygen or a steam/oxygen mixture to the output from the primary reformer off-gas and passing the combined mixture through a catalyst bed to convert residual methane to hydrogen and carbon monoxide. Normally, the primary reformer is operated at a higher throughput (greater process gas flow without increasing firing rate). Such an arrangement increases the overall system capacity and provides more methane for conversion in the secondary oxygen unit.

A number of literature references have discussed this subject matter. U.S. Pat. No. 6,217,681 B1 discloses the use of an oxygen rich vent stream as the oxygen source for oxy-fuel combustion or enrichment oxygen in air-fuel combustion to provide heating for primary melting of glass or aluminum. However, there is no teaching or suggestion for the use of the waste oxygen stream in the SMR combustors to enhance hydrogen production.

U.S. Pat. No. 6,200,128 B1 discloses the recovery of heat from a gas turbine exhaust by introducing the exhaust into a combustion device and adding an oxidant having a concentration greater than 21% to form a mixture that has an oxygen content less than 21%. Further, the patent discloses operating the combustion device at conditions substantially equal to those achieved with air combustion of fuel in the combustion device.

Wei Pan et al. ("$CO_2$ Reforming and Steam Reforming of Methane at Elevated Pressures: A Computational Thermodynamic Study" Proc.—Annu Int. Pittsburgh Coal Conference, Vol. 16, 1999, pp. 1649–1695) discloses carbon dioxide reforming and the replacement of steam with oxygen in the carbon dioxide reforming process. The calculations therein provide the equilibrium conditions at given input temperatures and pressures. Steam methane reforming is not specifically discussed and no teaching or suggestion as to how this would be implemented.

V. R. Choudhary et al. ("Simultaneous Steam and $CO_2$ Reforming of Methane to Syngas over NiO/MgO/SA-5205 in the Presence and Absence of Oxygen," Applied Catalysis A: General, 168, (1998), pp. 33–46) discloses the performance of different gas mixtures on methane conversion to syngas based on a ~1 ms residence time catalytic reactor. Because of the short residence time, the reaction section is essentially adiabatic, no significant amount of heat transfer is possible. There is no teaching or suggestion for applying catalyst in conventional furnace based reformer systems.

G. J. Tjatjopoulos et. al. ("Feasibility Analysis of Ternary Feed Mixture of Methane with Oxygen, Steam, and Carbon Dioxide for the Production of Methanol Synthesis Gas," Industrial and Engineering Chemistry Research, Vol. 37, No. 4, 1998–04, pp. 1410–1421) discloses the impact of various mixtures on the thermodynamic equilibrium achieved at the end of the reactor. This reference discloses implementing systems with $CH_4/O_2/H_2O$ mixtures involves a two stage process involving primary and secondary reformers if the ternary mixture is endothermic and a single stage adiabatic unit if the mixture is exothermic.

U.S. Pat. No. 5,752,995 discloses the use of a specific catalyst in reforming reactions including space velocity considerations as well as steam to carbon ratio specifications and the use of oxygen containing gas from a group consisting of steam, air, oxygen, oxides of carbon and mixtures thereof. There is no teaching or suggestion on the addition of oxygen to SMR process feeds to increase the productivity of existing reformers.

EP1 077 198 A2 and EP1 077 198 A3 disclose the addition of a pre-reformer to remove oxygen from the feed to the primary reformer. There is no teaching or suggestion for the addition of oxygen to the primary reformer process feed gas.

Lambert, J. et. al. ("Thermodynamic Efficiency of Steam Methane Reforming with Oxygen Enriched Combustion," The $5^{th}$ World Congress of Chemical Engineering: Technologies Critical to the Changing World. Volume III: Emerging Energy Technologies, Clean Technologies, Remediation, and Emission Control; Fuels and Petrochemicals. Jul. 14–18, 1996, San Diego, Calif., Publisher; AIChE, NY, N.Y. pp. 39–44) discloses the use of oxygen-enriched air combustion in combination with steam methane reforming and water gas shift reactions. Lambert et al. discloses improved conversion of methane at constant fuel (furnace firing rates) and process feed gas rates. However, there is no teaching or suggestion as to how this would impact existing reformers.

There are disadvantages to each of the prior art production enhancements. For instance, in a production enhancement that involves increasing the firing rate of the combustion section, lower operating efficiencies result because the temperature and flow of the flue gas leaving the furnace is higher than at normal firing rates and, unless the convective heat recovery section is modified, the stack temperature will be higher than under the original operating mode. Moreover, the higher flow rates and temperatures can exceed fuel system control limits, induced draft fan limits, and excess reformer tube wall temperatures. Changes in control systems, and induced draft fans require capital and time to implement.

The main disadvantage of adding a low temperature shift unit is that it is only an option in cases where one does not already exist. It is to be noted that adding such a unit does not actually increase the capacity of the reforming process. These units are difficult to operate and improve operations by increasing the conversion of reformer product to hydrogen. The low temperature shift option requires additional capital, is limited by the residual carbon dioxide content of the gas leaving the high temperature shift unit, and is of little or no value if the syngas produced by the reformer is used for producing chemicals such as methanol or ammonia.

The addition of a pre-reformer is also a capital intensive endeavor because it involves the addition of a catalytic reactor in addition to modifying the convective heat recovery section to provide the heat necessary for driving the reforming reactions. In addition the export stream that would otherwise be produced is lost because the heat from the convective section used to drive the pre-reformer is no longer available to produce steam. The large quantity of catalyst used in the pre-reformer is generally twice as expensive as that for the primary reformer and has a relatively short life. In addition, the quantity of steam available for export is reduced.

Post reforming accomplished by a bypass-feed product-heat-exchange reformer is also capital intensive because it involves the addition of a catalytic reactor downstream of the primary reformer. Maintenance is difficult on this heat-exchanger reactor. In addition, export steam production is lost because the heat in the exhaust of the primary reformer is used to drive additional hydrocarbon conversion to carbon monoxide and hydrogen. This concept was developed to eliminate or reduce export steam production from the reformer.

An oxygen secondary reformer is a refractory-lined reactor with a combustor located at the entrance to the catalyst bed. The secondary reformer is placed downstream of the primary reformer. Oxygen, or a mixture of oxygen and steam is reacted with the primary reformer product to raise the temperature of the mixture up to about 2,200° F. Relatively large quantities of the oxygen and steam are required to accomplish this temperature rise (600° F. to 800° F.). In addition, significant changes to the carbon dioxide removal system may be required because of the higher levels of carbon dioxide produced to raise the inlet temperature to the reformer.

As will be discussed, the present invention provides a process for increasing the amount of production that can be accommodated within an existing reformer or other reactor that can be effectuated without redesign of the reactor or the addition of expensive components and that is inherently more energy efficient than prior art methods.

SUMMARY OF THE INVENTION

The present invention provides a process for increasing the production of a product stream of a reactor configured such that a fuel stream and an oxygen containing stream are consumed in a combustion section of the reactor to generate heat and a reactant stream and a steam stream are consumed in an endothermic reaction section supported by the heat to generate the product stream.

In accordance with one aspect of the present invention, supplemental oxygen is introduced at least into the combustion section to allow for an increase in combustion and therefore the heat generated thereby. The fuel stream, the reactant stream, and steam stream are introduced into the reactor at increased supply rates that are above those that would otherwise be used had the oxygen containing stream been supplied to the reactor alone. This acts to support the increase in the heat and an increase in the product stream produced. The increased supply rates at which the fuel stream, reactant stream and steam stream are supplied are selected relative to the amount of supplemental oxygen supplied such that a temperature rise, anywhere within the reactor is not greater than about 200° C. over that which would be observed with the use of the oxygen containing stream alone.

In another aspect of the present invention, the supplemental oxygen is introduced at least into the reaction section to partially oxidize the reactant stream, thereby to generate additional heat and to provide an increase in the production of product for the product stream. The reactant stream and the steam stream are introduced into the reaction section at increased supply rates that are above those that would otherwise be used had the oxygen containing gas been supplied to the reactor alone, thereby to support the partial oxidation and a further increase in the production of the production for the product stream.

The increased rates at which the reactant and steam stream are supplied are selected relative to the amount of supplemental oxygen supplied such that a temperature rise anywhere within the reformer is not greater than about 200° C. over that which would be observed with the use of the oxygen containing gas alone.

The invention in either aspect utilizes oxygen enhancement to permit the increased flows of the reactants to the reactor, achieve similar compositions in the reactor outlet, and, therefore, increase the reactor productivity. As may be appreciated, in either aspect of the present invention the supplemental oxygen can be introduced into both the combustion section and the reaction section. The use of supplemental oxygen is particularly advantageous over prior art methods that involve increasing the air and fuel supply alone.

The present invention allows for enhancement in reforming without a loss in efficiency and is a significant advancement over processes in which the there is no enhancement or the firing rate is increased. The present invention has a higher thermal efficiency than the increased firing rate case. Where supplemental oxygen is added to the combustion section of the reactor, the flow of combustion gases through the reactor and the subsequent heat recovery sections are maintained at the same rate as the design for normal operation on air. In the aspect of the present invention in which the supplemental oxygen is added to the reaction section, all of the heat produced through reacting the oxygen with the reactant will be used directly in the endothermic reaction.

The present invention also avoids the problems associated with fuel system control limits, induced draft fan limits, and excess reformer tube wall temperatures that occur with increased firing rates. In the present invention, where the supplemental oxygen is added to the combustion section, most of the additional heat produced by the combustion is available at the front end of the reformer where tube wall temperatures are low, due to the highly endothermic nature of the reforming reactions in that portion of the reformer. When supplemental oxygen is added to the reaction section, little additional heat from the furnace is needed to drive the reactions. The oxygen partial oxidation provides most of that heat. In any event, since supplemental oxygen is added in amounts that constrain temperatures within the reactor to be less than about 200° C., the application of the present invention avoids the possibility of high exhaust temperatures from the reactor which would require modification of downstream equipment such as heat recovery steam generators to account for the increase in downstream heat to be removed.

In either aspect of the present invention, the reactor can be a steam methane reformer or a pyrolysis furnace or a dehydrogenation furnace. In this regard, the reactor can be a steam methane reformer to produce a syngas product from the endothermic reforming reaction of a hydrocarbon containing reactant.

The supplemental oxygen can be directly introduced into the reaction section or can be introduced into the steam stream or into a mixture of the steam stream and the reactant stream.

In case of the introduction of the supplemental oxygen into the combustion section of a steam methane reformer that produces syngas as a product from the endothermic reforming reaction of a hydrocarbon containing reactant, the supplemental oxygen can be introduced into the reformer by mixing said supplemental oxygen with the oxygen containing gas. In this regard, the oxygen containing gas need not be air and thus, can contain a lower oxygen content. For instance the oxygen containing gas stream can be a gas turbine exhaust.

Although a central advantage of the present invention is that increased production may be accomplished without addition of the capital intensive add-ons discussed above, such additional equipment can be used in connection with the present invention For instance, a low temperature shift unit can be added to further increase the hydrogen production. A pre-reformer can also advantageously, albeit not without significant capital expenditure, to pre-reform the reactant and steam mixture can be pre-reformed prior to its introduction into the reaction.

BRIEF DESCRIPTION OF THE DRAWINGS

Other objects, features and advantages will occur to those skilled in the art from the following description of preferred embodiments and the accompanying drawings, in which.

DETAILED DESCRIPTION

It is to be noted that the present invention will be described in relation to a steam methane reformer. This description should not, however, be taken as being limiting in that, as mentioned above, the present invention has application to any reactor having combustion sections used to generate heat to support endothermic chemical reactions taking place within an endothermic reaction sections. Specifically, the present invention could also be used in connection with pyrolysis furnaces and dehydrogenation furnaces.

In accordance with the present invention, supplemental oxygen is added either directly to the combustion section, the reaction section or a mixture of a reactant and steam or steam alone that is fed to the reactant section. The amount of oxygen added are selected in a known manner to prevent a temperature rise within the reformer that is greater than about 200° C.

Figure 1:
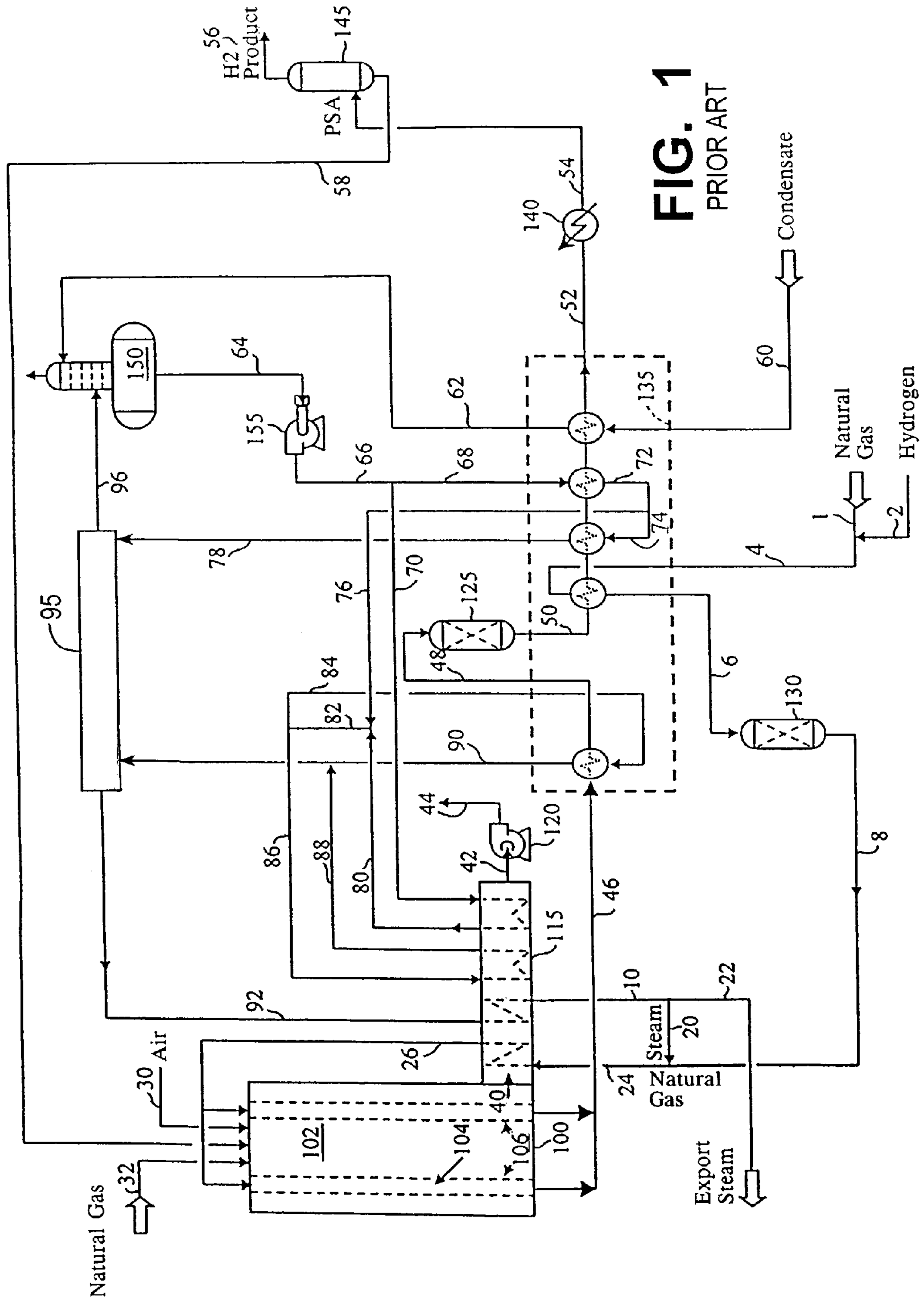
FIG. 1 is a schematic representation of a steam methane reformer system used for the production of hydrogen from natural gas.

FIG. 1 shows the schematic diagram representative of a steam methane reformer system used for the production of hydrogen from natural gas. This is representative of a "high steam case." This type of plant is designed for a relatively large quantity of steam for export. Other types of hydrogen plant designs are used. One designated "low steam" design preheats the air to the combustor using heat in the flue gas, thus reducing the heat available for steam generation. There are other hydrogen and syngas designs based on steam methane reforming. The one described below uses a baseline for analyzing the impact of oxygen enhanced reformer operations. A critical assumption in these analyses is that for existing reformer based systems all equipment sizes are fixed. Additional capital is needed to change/modify equipment.

In FIG. 1, a natural gas stream 1 is mixed with a small amount of a hydrogen product stream 2 to form stream 4 that is preheated in product heat recovery system 135. The heated stream 6 is hydrotreated and sulfur is removed in combined hydrotreater adsorber 130. The sulfur-free feed stream 8, a reactant stream, is mixed with steam stream 20 to form a stream 24 that is superheated against flue gas stream 40 in heat recovery unit 115, also known as the reformer's convection section. The steam to carbon ratio in stream 24 can vary depending on the design but normally is about 3/1. The stream 24 is further heated against flue gas 40 prior to injection as a heated stream 26 into the reformer tubes 106 contained in reformer 100 that serve as the reaction section thereof. The internal volume of the reformer tubes 104 are filled with catalyst, usually composed of nickel compounds. The catalyst promotes the conversion of the natural gas-steam mixture to hydrogen and carbon monoxide. Gas temperatures in the reformer ranges from about 900° F. to about 1700° F. Gas temperatures within the tubes increase from the reformer inlet to the exit. The maximum gas temperature, normally about 1600° F. is at the reformer exit. Both the steam methane reforming reaction and the shift conversion reaction take place within tube volume 104. The reformed gas exits reformer 100 as product stream 46. Product stream 46 is cooled in process-gas heat-recovery system 135 against hot water producing steam. After steam is generated, the still hot syngas exits unit 135 as stream 48 and enters shift conversion unit 125 where the shift reaction is driven further to the right (i.e., production of hydrogen and carbon dioxide).

The shift conversion reaction is slightly exothermic and the unit(s) normally operates at temperatures ranging from about 400° F. to about 900° F. In this case, stream 50, leaving the shift conversion reactor at up to about 800° F., is reintroduced to unit 135 where it is cooled against the feed gas 4 and various streams containing water. Gas stream 52, exiting process heat recovery section 135, is further cooled in unit 140 either against cooling water or through the use of fin-fan type air coolers prior to being introduced as stream 54 into the PSA 145. Not shown are various knockout units used to separate condensed water vapor from the process gas stream. The PSA produces hydrogen 56 at purities ranging from about 99% to about 99.999% based on the system design. The PSA hydrogen recovery can range from about 75% to about 95%. The unrecovered hydrogen and any carbon monoxide, methane, water vapor, and nitrogen present in stream 54 are purged from the PSA unit as tail gas 58. The tail gas is normally sent back to the reformer to be used as fuel.

An additional natural gas stream 32 and, for hydrogen plants with PSA purification, PSA tail gas stream 58 are burned with air 30 in burners (not shown) in a combustion section to provide the heat to drive the reforming reactions. The burner exhausts into the "radiant" section 102 of the reformer 100 where the heat generated through combustion is transferred by radiant and convective mechanisms to the surface of tubes 106. Heat from the tube surface is conducted to the interior of the tubes and transferred to the process gas through convection. The tube wall temperature is a critical parameter influencing the life of the tubes. Excess temperatures can dramatically reduce the time between tube replacements. The flue gas stream 40, leaving the radiant section at temperatures ranging from about 1600° F. to about 2000° F., enters the convection section 115 where the contained sensible heat is used to preheat the natural gas-steam mixture as well as produce and superheat steam. The flue gas 42 leaving the convection section enters an induced draft fan 120 which is used to maintain the radiant section of the reformer at a pressure slightly below atmospheric. Stream 44 is sent to a flue stack where it is vented to the atmosphere, normally at temperatures in excess of about 260° F.

Stream 60, a mixture of condensate and makeup boiler feedwater, is heated in unit 135 to form a heated stream 62 that is then de-aerated in unit 150. Steam 96 is commonly used as a purge gas in the de-aerator. The de-aerated boiler feed water is pumped as a stream 64 in unit 155 to the pressure needed to provide superheated steam at sufficient pressure for mixing with natural gas to produce stream 24 and/or high enough to provide superheated steam for export. Stream 66 is split into streams 68 and 70. Stream 68 is sent to unit 135 for heating to near its boiling temperature. Stream 72 is then split into streams 74 and 76. Stream 74 is boiled in unit 135. Stream 70 passes to unit 115 for heating to near its boiling temperature. Stream 80 is mixed with stream 76 to form stream 82 and then is split into streams 84 and 86 that pass to units 135 and 115 to be vaporized. Saturated steam as stream 88 from unit 115 and stream 90 from unit 135 are mixed with stream 78 in saturated steam header 95. Most of the steam is sent as stream 92 to be superheated in unit 115. A small quantity 96 is sent to the deaerator 150. The superheated steam leaves unit 115 as stream 10 and is split into steam stream 20 for mixing with the natural gas feed to the reformer and into stream 22 which can be sold, used to produce electricity, or used to provide heat to unit operations associated with a refinery or chemical plant operations.

Figure 1A:
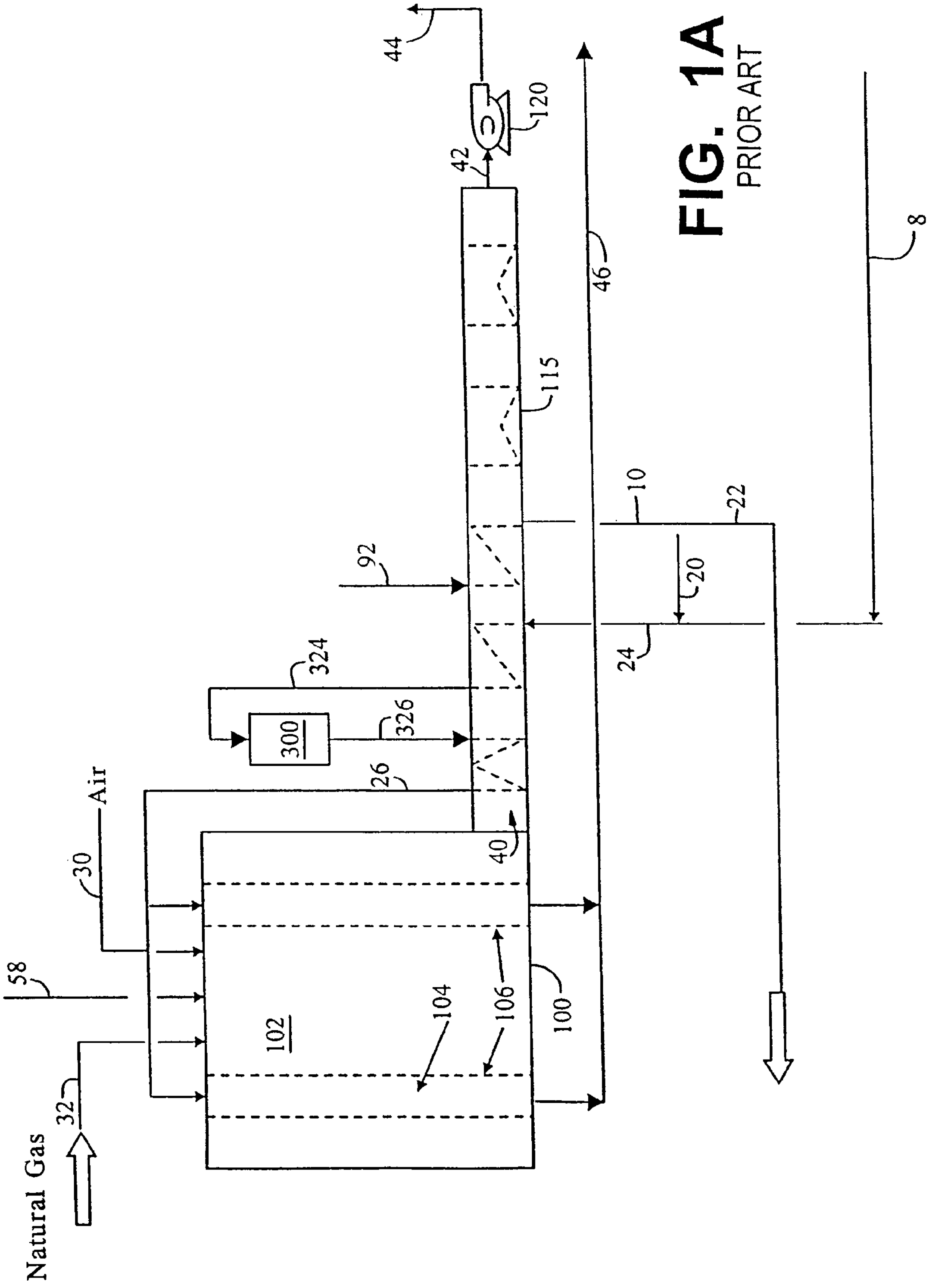
FIG. 1A is a partial schematic representation of the steam methane reformer system used for the production of hydrogen from natural gas, particularly providing a pre-reformer.

FIG. 1A shows a conventional method for enhancing the output of a steam methane reformer illustrated in FIG. 1. Normally, the flue gas recovery section of the heat recovery unit 115 is modified by the additional heat recovery area. In this modified case, stream 24, composed of steam and natural gas, is heated in heat recovery unit 115 to a temperature of from about 900° F. to about 1150° F. prior to being transported as stream 324 to a pre-reformer 300. Pre-reformer 300 operates a low temperature steam reforming process for syngas production in an adiabatic reactor containing a highly active catalyst. Post pre-reformer stream 326 is a mixture essentially consisting of hydrogen, carbon monoxide, carbon dioxide, water vapor and methane. Because the pre-reforming process on natural gas and steam is endothermic, stream 326 is cooler than stream 324. Stream 326 is then re-heated in heat recovery unit 115 prior to introducing the partially reformed mixture into reformer 100. The heat recovered from flue gas 40 is used to drive the reforming reactions in pre-reformer 300. This in effect reduced the quantity of steam 22 coming off from heat recovery unit 115. The partial reforming process in pre-reformer 300 reduces the firing requiring for each unit feed in reformer 100. This enables about an 8–12% increase in the overall syngas production capacity of the system.

Figure 2:
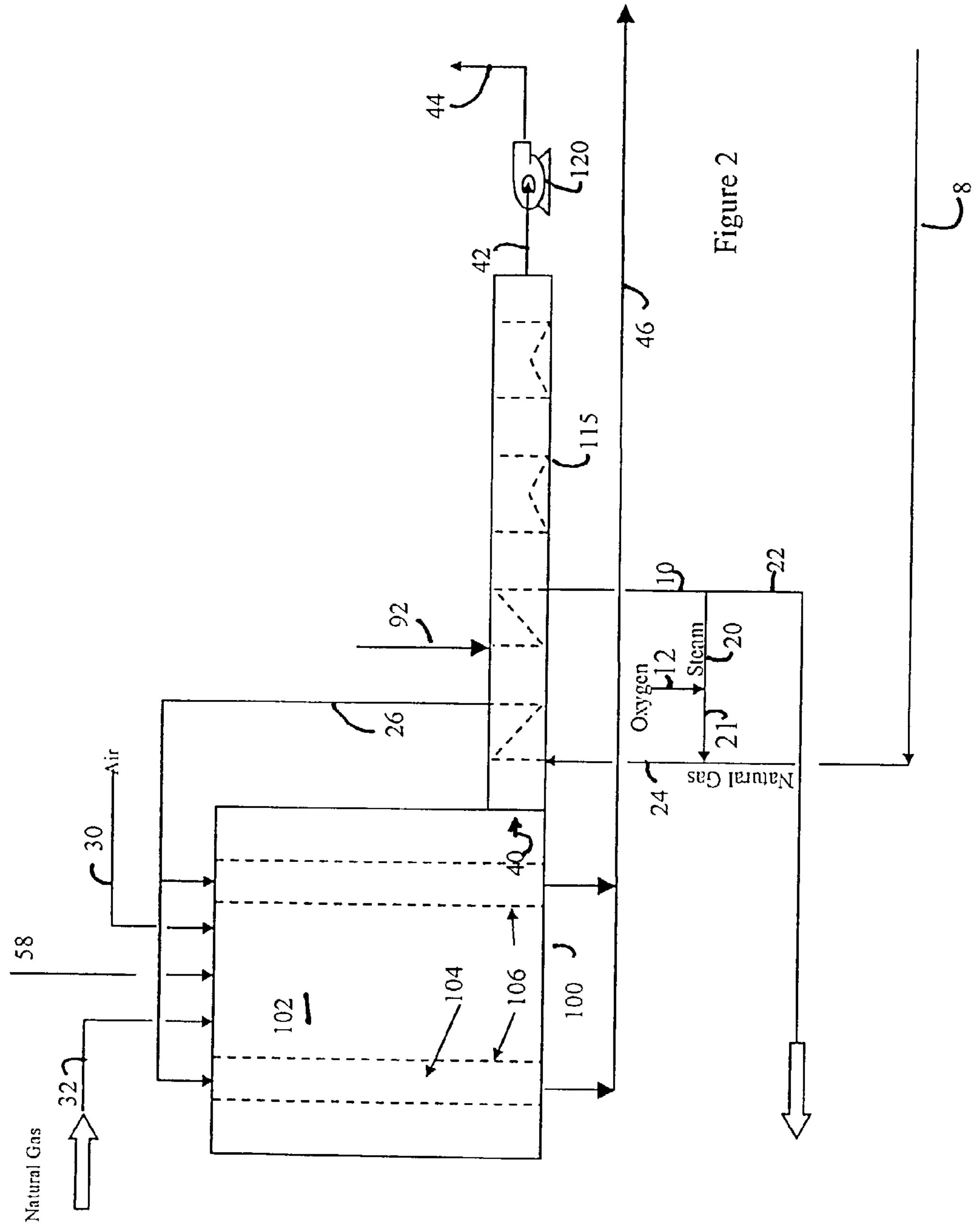
FIG. 2 is a partial schematic representation of the system that is directed to the reformer section with an oxygen addition to steam according to the present invention.
Figure 3:
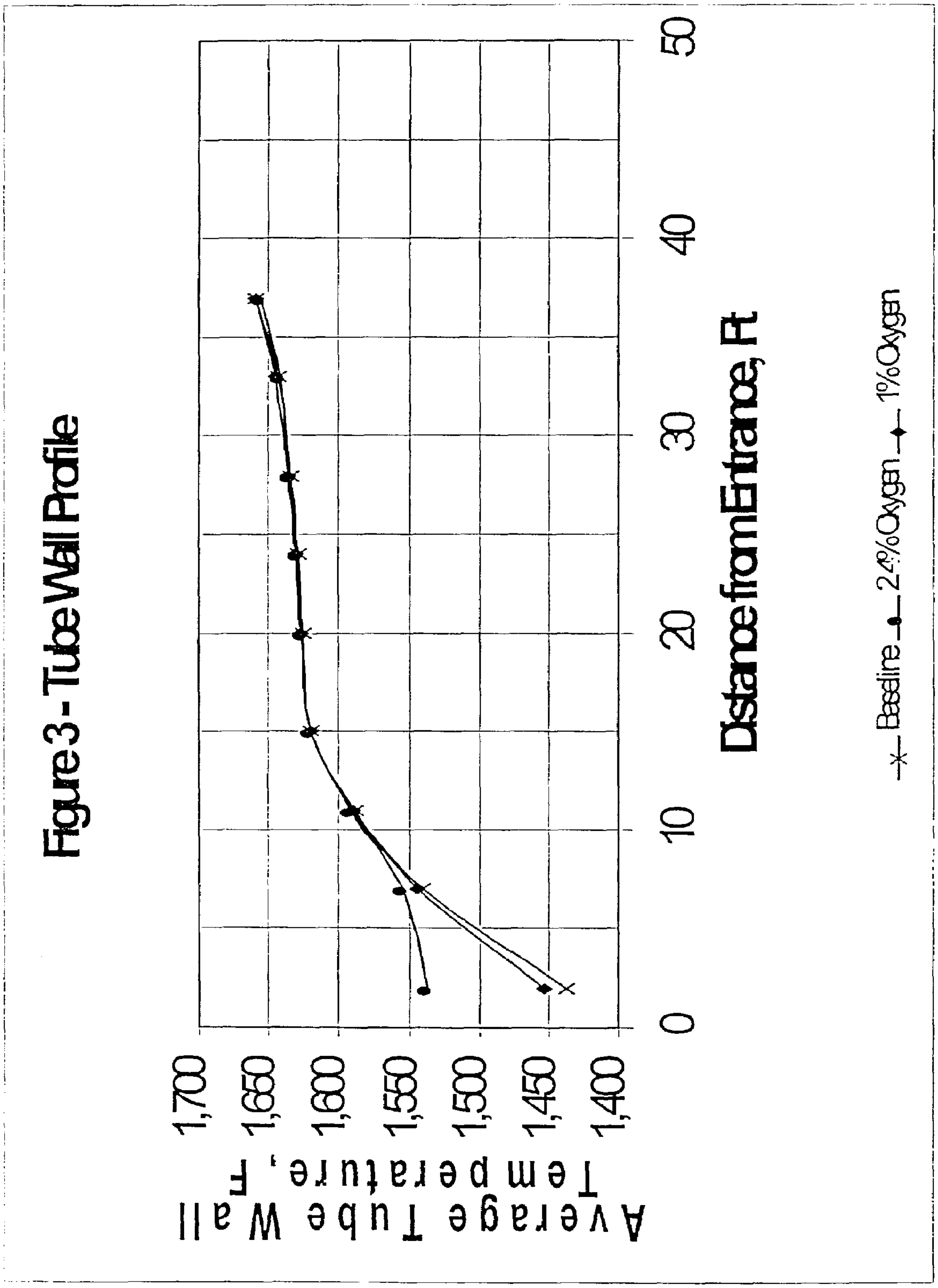
FIG. 3 is a graphical representation of the tube wall profile showing the average tube wall temperature against the distance from the entrance of the tube wall according to the present invention.

FIG. 2 illustrates a method of the present invention applied to the reformer section of the process shown in FIG. 1. Advantageously, the output of the reformer is increased without making changes in units 100, 115 and 120 and without dramatically reducing the steam production rate from the system. As provided herein, similar legends will have the same legend numbers in all of the figures. The critical difference between FIGS. 1 and 2 is the addition of supplemental oxygen to natural gas containing process gas. In an embodiment, a supplemental oxygen stream 12 that is normally at least 96% purity, and preferably greater than 99.5% purity is added to the steam stream 20 to form stream 21 that is then mixed with the hydrotreated and desulfurized natural gas stream 8 to form stream 24. The higher purity is required to minimize the argon and nitrogen contaminants in the product from the hydrogen plant. If the final reformer product is for syngas generation for ammonia or other chemicals or fuels, lower purity oxygen or even air may be used to enhance reformer output. Stream 24 is preheated in unit 115 and is transferred to the reformer tubes via stream 26. The oxygen added prior to introducing the process gas to the reformer results in additional syngas production because partial oxidation reactions will occur in the reactor in addition to the steam methane reforming and water-gas shift reactions. Since the partial oxidation reaction is exothermic:

$$CH_4+1/2O_2 \leftarrow\rightarrow 2H_2+CO$$

no additional heat is required from the combustion of fuel in the burners to provide the additional syngas (hydrogen plus carbon dioxide). Standard reforming catalyst can be used. However, if the retrofit of oxygen addition corresponds to a catalyst change-out then a layered catalyst using approach using a more effective partial oxidation catalyst followed by a more effective reforming catalyst could be employed. Since no additional heat transfer is required in the radiant zone 102 of the reformer 100 to get additional output, the tube wall temperatures can be maintained near their original design as shown in FIG. 3. The higher temperature in the initial portion of the tube, near the inlet to the reformer, is a result of the partial oxidation reaction.

Table 1 shows the relative performance of the SMR consistent with the reformer temperature curve, shown in FIG. 3. The "oxygen %" is mole percent oxygen in the steam-natural gas-oxygen mixture 24. For 2.4% oxygen in the process gas stream, a 13% increase in reformer output is achieved with only a 9% increase in natural gas rate. In these analyses, the forced draft fan 120 is operated at the original design rate resulting in a constant flue-gas flow rate between the two cases. The fuel "firing" rate is held constant and the process gas flow is increased to ensure that the temperature of the flue gas leaving the reformer is equivalent in all cases. Under these conditions the amount of heat transferred in unit 100 and in unit 115 are the same in all cases.

The additional steam needed in stream 20 to maintain a constant steam to carbon ratio in stream 24 is obtained from the process heat recovery section 135 of FIG. 1. The water flow rates are adjusted to match the heat recoverable from the process gas stream before and after shift conversion unit 125 FIG. 1. The heat exchanger areas in both 115 and 135 do not require modification to provide the additional steam. Stream 52 is a little hotter in the cases with oxygen addition compared to the baseline reformer because more mass is being processed through heat exchangers of a constant surface area. The additional heat recovery is obtained by somewhat larger temperature differentials in the heat exchangers.

TABLE 1

| Relative SMR Performance-Oxygen Added to Process Gas | | | |
|---|---|---|---|
| | Baseline | 1% Oxygen | 2.4% Oxygen |
| Total Natural Gas Rate (Process plus fuel) | 1.00 | 1.04 | 1.09 |
| Process Gas-Inlet Temp, F. | 1050 | 1024 | 989 |
| Process Gas-Steam/Carbon Ratio | 3.0 | 3.0 | 3.0 |
| Process Gas-Reformer Outlet Temp, F. | 1600 | 1600 | 1600 |
| Process Gas-Heat Recovery Exit Temp, F. | 295 | 303 | 312 |
| Fuel Gas Inlet Temp, F. | 103 | 103 | 103 |
| Combustion Air temp, F. | 90 | 90 | 90 |
| Relative Combustion Air Rate | 1.0 | 1.0 | 1.0 |
| Relative Firing Rate, Btu(lhv)/h | 1.0 | 1.0 | 1.0 |
| Radiant Zone Flue Gas Outlet, F. | 1899 | 1903 | 1900 |
| ID Fan Inlet, T | 358 | 361 | 364 |
| Reformer Product Rate ($H_2$ plus CO) | 1.00 | 1.06 | 1.13 |

The maximum oxygen addition level that can be expected is about 5 mole %. Above that addition level, the ability to increase the productivity of the reformer will be limited by the pressure drop across in the reformer tubes. At 5 mole % oxygen in the steam-natural gas-oxygen mixture 24 would yield 25% to 30% increase in reformer capacity. If the oxygen addition concept is being implemented coincidentally with a tube change, it is possible to install larger tubes to accept the high flow rate associated with the 5 mole % oxygen mixture.

Figure 4:
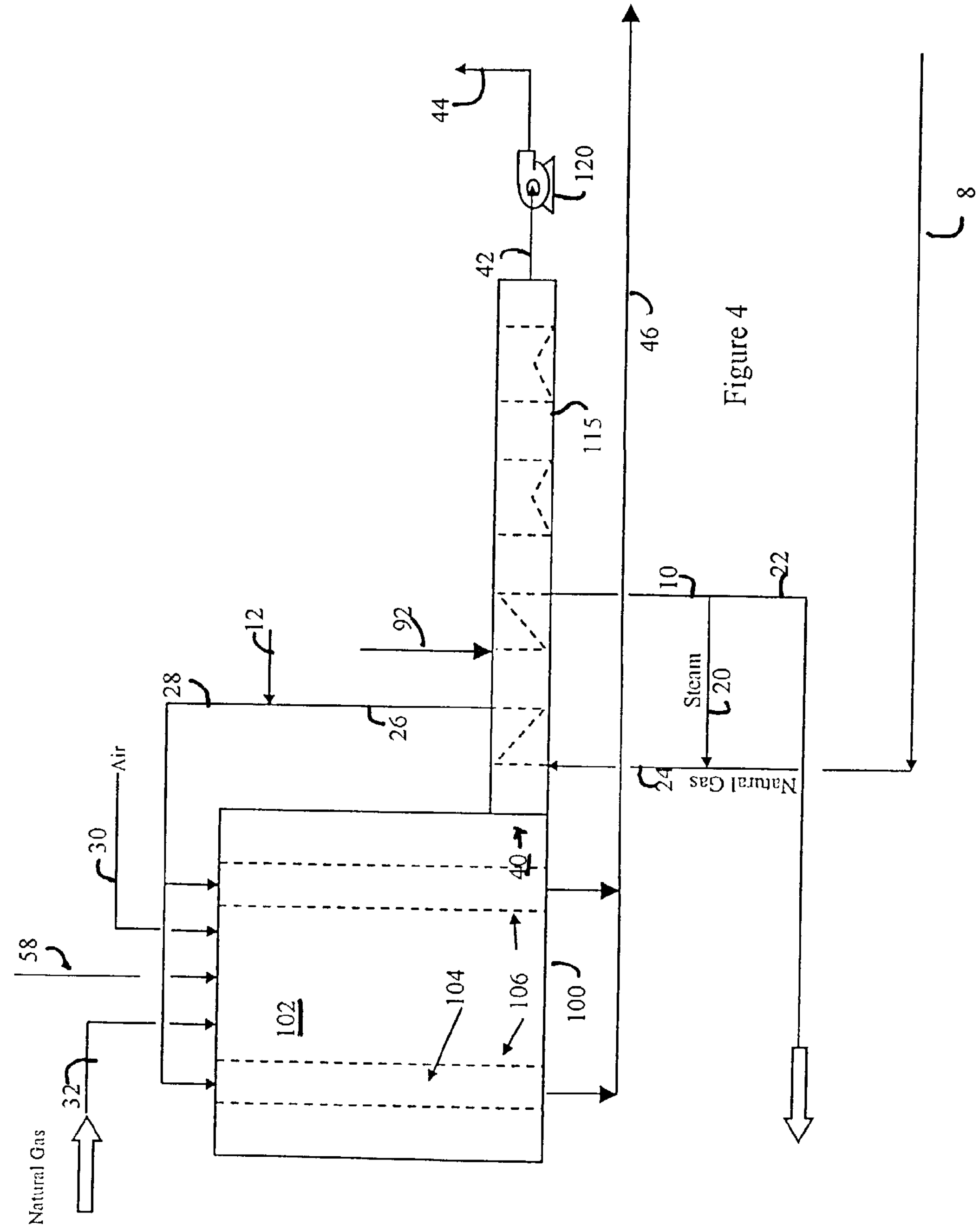
FIG. 4 is a partial schematic representation of the system that is directed to the reformer section with an oxygen addition to the steam-methane mixture according to the present invention.

FIG. 4 shows an alternative configuration of supplemental oxygen addition to the reformer feed. In this case the supplemental oxygen as the supplemental oxygen stream 12 is added to the heated stream 26 containing the heated steam-natural gas mixture- to form a stream 28 for introduction to the reformer tubes. Because supplemental oxygen stream 12 is delivered at a lower temperature (normally<300° F.) than the steam-natural gas mixture contained in stream 24 (normally>900° F.) a slight increase in the oxygen concentration is required to achieve the performance shown in Table 1.

Figure 5:
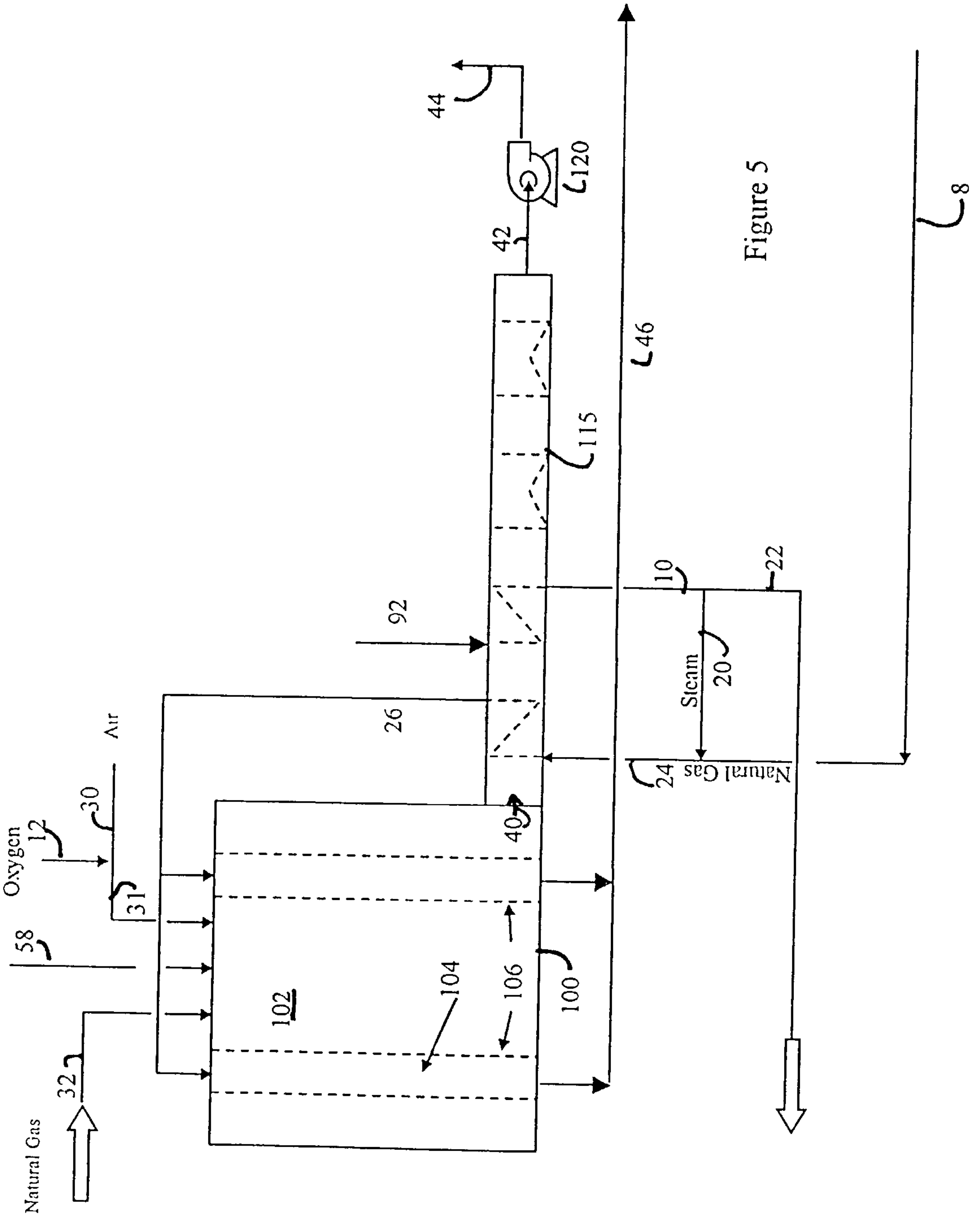
FIG. 5 is a partial schematic representation of the system that is directed to the reformer section with an oxygen addition to the combustion air according to the present invention.

FIG. 5 presents the alternative approach to enhancing the throughput of existing steam methane reformers. The overall system is similar to the description provided for FIG. 1. In this embodiment the combustion air 30 is enriched using supplemental oxygen stream 12. The source of the oxygen can be liquid from a cryogenic plant, gaseous oxygen from an oxygen plant (PSA, cryogenic or membrane) or waste oxygen from a nitrogen plant (cryogenic or membrane). Induced draft fan 120 is maintained at the same rate as the baseline air system and all heat exchangers in unit 115 and 135 are unchanged. The flow rate of stream 26 fed to the reformer is increased proportional to the oxygen enrichment rate to produce additional syngas and to maintain the tube wall temperatures within acceptable limits.

Table 2 summarizes the relative performance of the SMR as a function of the level of air enrichment. At the 21.7 mole % level it is highly likely that the 12% improvement in product rate can be achieved without problems with pressure drop in the reformer or other issues with downstream processing units. At 22.5 mole %, debottleknecking of the reformer tubes and other downstream processing equipment may be necessary. The maximum enrichment is limited to a level of about 25 mole % to 26 mole % oxygen in the combustion gas. Above that level, reformer tube pressure-drops will pose a major problem and significant amounts of capital will need to be invested for debottlenecking. Unlike the cases presented in Table 1, additional fuel firing is needed to obtain the projected output increases. The burner/fuel system modifications that may be needed by this approach makes the concept somewhat less attractive than adding supplemental oxygen to the reaction section of the reformer. In addition, the higher adiabatic flame temperatures may lead to a slight increase in NOx emissions when enriched combustion air is used.

TABLE 2

Relative SMR Performance-Air Enrichment

| | Baseline-20.3% wet | 21.7% wet | 22.5% wet |
|---|---|---|---|
| Total Natural Gas Rate (Process plus fuel) | 1.00 | 1.08 | 1.13 |
| Process Gas-Inlet Temp, F. | 1050 | 1019 | 986 |
| Process Gas-Steam/Carbon Ratio | 3.0 | 3.0 | 3.0 |
| Process Gas-Reformer Outlet Temp, F. | 1600 | 1590 | 1576 |
| Process Gas-Heat Recovery Exit Temp, F. | 295 | 301 | 308 |
| Fuel Gas Inlet Temp, F. | 103 | 103 | 103 |
| Combustion Air temp, F. | 90 | 90 | 90 |
| Relative Combustion Air/Enriched Air Rate | 1.0 | 1.0 | 1.0 |
| Relative Firing Rate, Btu(Ihv)/h | 1.0 | 1.07 | 1.11 |
| Radiant Zone Flue Gas Outlet, F. | 1899 | 1923 | 1930 |
| ID Fan Inlet, T | 358 | 365 | 368 |
| Reformer Product Rate ($H_2$ plus CO) | 1.00 | 1.12 | 1.17 |

The cases presented in Table 2 are derived from system with the same heat exchange surface areas in units 115 and 135. Because the temperature of stream 40 is higher in the enrichment cases more heat is recovered in unit 115. Most of the steam required to maintain the steam to carbon ratio in the reformer feed is obtained from heat recovery section 135 due to the high mass throughput in that section.

Figure 5A:
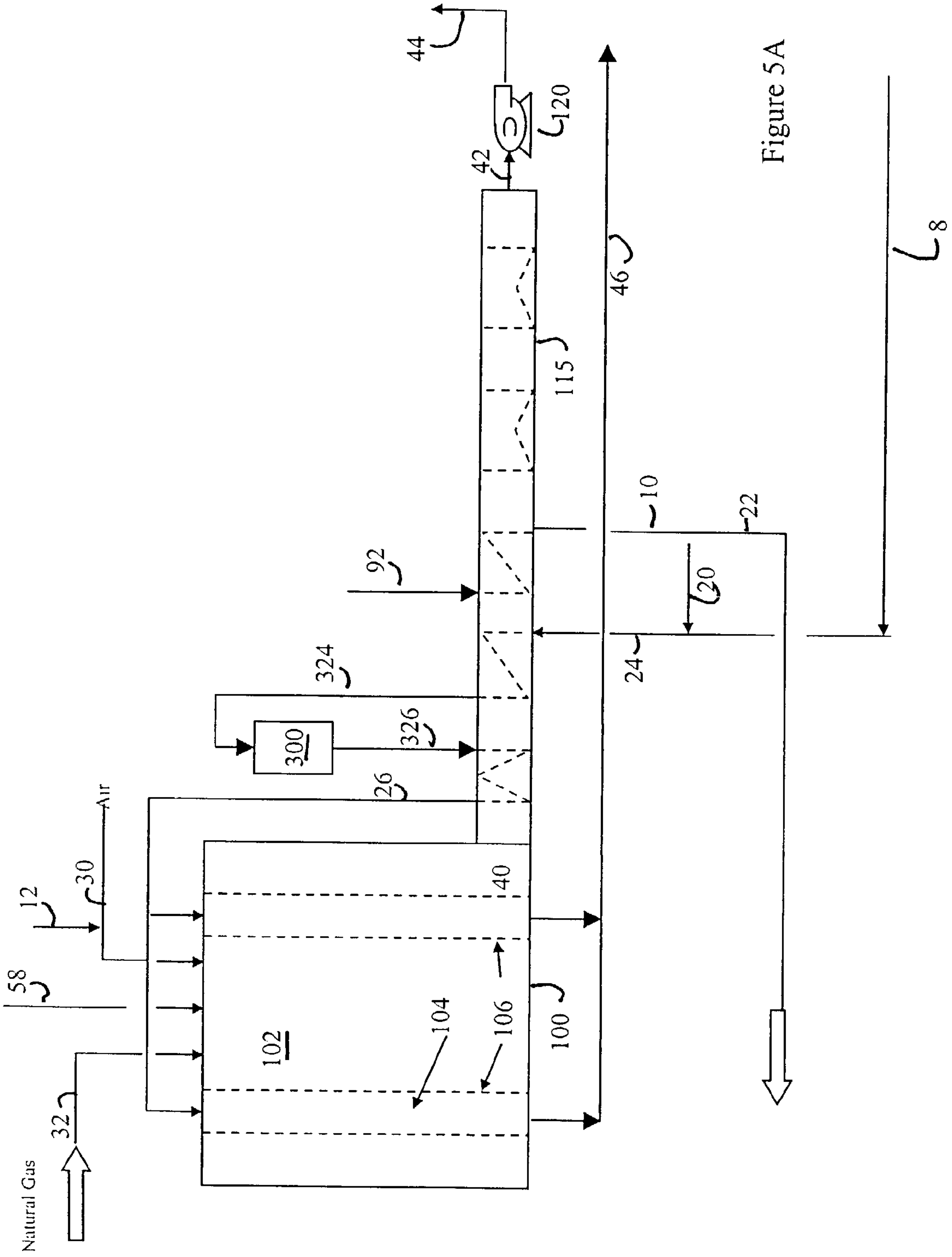
FIG. 5A is a partial schematic representation of the steam methane reformer system used for the production of hydrogen from natural gas, particularly directed to the reformer section with an oxygen addition to the combustion air, and passing steam and natural gas, to a pre-reformer prior to passing to the reformer according to the present invention.

Another embodiment of the invention in FIG. 5 is shown in FIG. 5A. In this embodiment, supplemental oxygen stream 12 is added to combustion air stream 30 to further increase the productivity of a steam reformer that incorporates pre-reformer 300. Supplemental oxygen stream 12 increases the energy produced and liberated through combustion of the catalyst containing tubes 106 in reformer 100. The use of oxygen enhancement for improving reformer productivity may result in an overall productivity. This increase in productivity may be as much as 40% over the performance of the steam-methane reformer alone and as much as a 25% over the combination of steam reformer that incorporates the pre-reformer.

Figure 6:
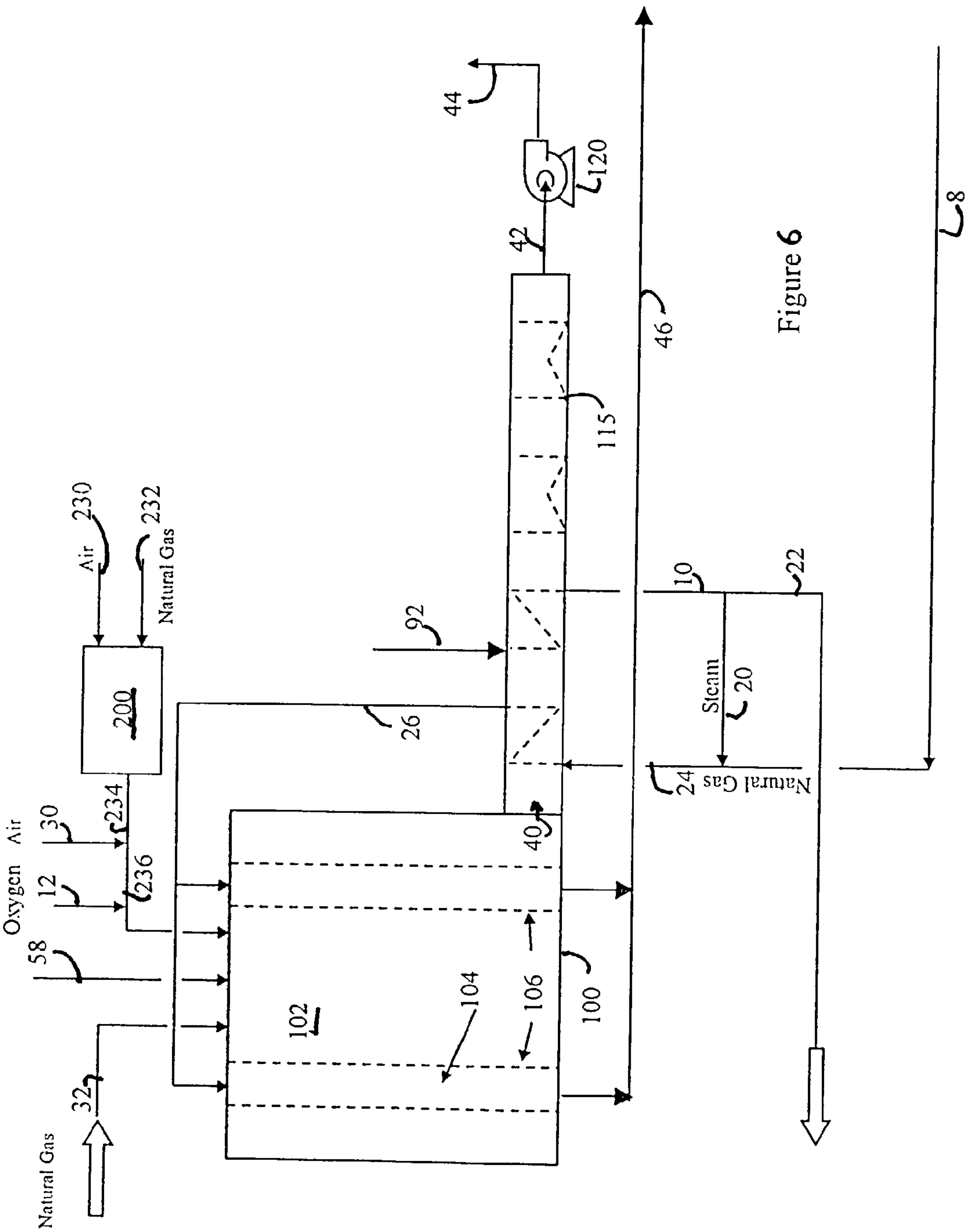
FIG. 6 is a partial schematic representation of the system that is directed to the reformer section with an oxygen addition to the gas turbine hot exhaust gas steam according to the present invention.

FIG. 6 shows the integration of a gas turbine 200 with an SMR 102. Air 230 and natural gas 232 are fed to the gas turbine 200. The gas turbine produces electricity or drives a compressor and exhausts a hot gas oxygen containing stream 234 is produced that has between about 10% and 18% oxygen. The hot gas can be mixed with additional air 30 to form stream 236. Stream 236 is further enriched with a supplemental oxygen stream 12 containing more than 21% to provide sufficient oxygen to burn the fuel streams 32 and 58 needed to drive the reformer at syngas production rate greater than that achievable with air alone. The relative flows of stream 10 and supplemental oxygen stream 12 are optimized based on the flow of gas from the gas turbine and the capacity of induced draft fan 120.

As an alternative to adding supplemental oxygen stream 12 to stream 36, higher purity oxygen—greater than about 96% oxygen by volume, could be added to the process gas as shown in FIG. 2.

The addition of embodiments in FIGS. 1A and 5A focused on the steam-methane reforming systems. Moreover, these embodiments also contemplates oxygen enhancement concepts applicable to steam reformer based syngas-hydrogen production systems using refinery off-gases, propanes, butanes and napthas as feedstock.

Additionally, both productivity improvement concepts as shown in FIGS. 2, 4, and 5, and as described in the text relating to these figures, are applicable to chemical processes that involve pyrolysis furnaces for dehydration of various feedstocks such as steam cracking to produce ethylene, propylene and butylene.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A process for increasing the production of a product stream of a reactor designed such that a fuel stream and an oxygen containing stream are consumed in a combustion section of the reactor to generate heat and a reactant stream and steam stream are consumed in an endothermic reaction section by an endothermic reaction solely supported by the heat generated in the combustion section to generate the product stream, the heat being transferred from the combustion section to the endothermic reaction section by indirect heat transfer, said process comprising:

introducing supplemental oxygen into at least the combustion section so as to provide oxygen enrichment for the combustion, an increase in combustion temperature and therefore the heat generated by the combustion without increasing the flow rate of the combustion gases; and introducing the fuel stream, the reactant stream, and steam stream into the reactor at increased supply rates that are above those that would otherwise be used had the oxygen containing stream been supplied to the reactor alone, thereby to support the increase in the heat and an increase in the product stream produced; and the increased supply rates at which the fuel stream, reactant stream and steam stream are supplied are selected relative to the amount of supplemental oxygen supplied such that a temperature rise, anywhere within the reactor is not greater than about 200° C. over that which would be observed with the use of the oxygen containing stream alone.

2. The process of claim 1, wherein the reactor is a steam methane reformer or a pyrolysis furnace or a dehydrogenation furnace.

3. The process of claim 1, wherein the reactor is a steam methane reformer and the product is syngas produced by an endothermic reforming reaction of a hydrocarbon containing reactant within the endothermic reaction section.

4. The process of claim 1, wherein said oxygen containing gas is gas turbine exhaust.

5. The process of claim 3, wherein the supplemental oxygen is introduced into the steam methane reformer by mixing said supplemental oxygen with the oxygen containing gas.

6. The process of claim 3, wherein the reactant stream is pre-reformed prior to its introduction into the endothermic reaction section.

* * * * *